(12) United States Patent
Yoo et al.

(10) Patent No.: US 6,300,624 B1
(45) Date of Patent: Oct. 9, 2001

(54) RADIATION DETECTOR

(75) Inventors: Kwang M. Yoo, Houston; Ward E. Schultz, Fulshear; Larry L. Gadeken, Houston, all of TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/276,431

(22) Filed: Mar. 25, 1999

(51) Int. Cl.[7] ................................................ G01V 5/00
(52) U.S. Cl. ................................ 250/254; 250/256
(58) Field of Search .............................. 250/254, 256, 250/262

(56) References Cited

U.S. PATENT DOCUMENTS

| 4,164,871 | 8/1979 | Cole et al. ........................ 73/432 |
| 4,694,166 | 9/1987 | Gearhart . | |
| 4,730,263 | 3/1988 | Mathis . | |
| 4,810,876 | * 3/1989 | Wraight et al. .................. 250/256 |
| 4,829,176 | 5/1989 | Paske et al. . | |
| 5,134,285 | 7/1992 | Perry et al. . | |
| 5,243,562 | * 9/1993 | Laurent et al. .................. 367/25 |
| 5,434,408 | 7/1995 | Smith, Jr. et al. . | |
| 5,804,820 | 9/1998 | Evans et al. . | |

FOREIGN PATENT DOCUMENTS

| 2039093 | 7/1980 | (GB) . |
| 2199940 | 7/1988 | (GB) . |
| 1-126585 | * 5/1989 | (JP) . |
| 605950 | * 4/1978 | (SU) . |

* cited by examiner

Primary Examiner—Frank G. Font
Assistant Examiner—Zandra V. Smith
(74) Attorney, Agent, or Firm—Conley, Rose & Tayon, P.C.

(57) ABSTRACT

The invention is a stationary radiation detection tool that provides an azimuthal indication of the location of subterranean radiation sources. In one embodiment, the tool has four gamma ray sondes, each of which receives gamma rays from a discrete sector of surrounding formation.

29 Claims, 4 Drawing Sheets

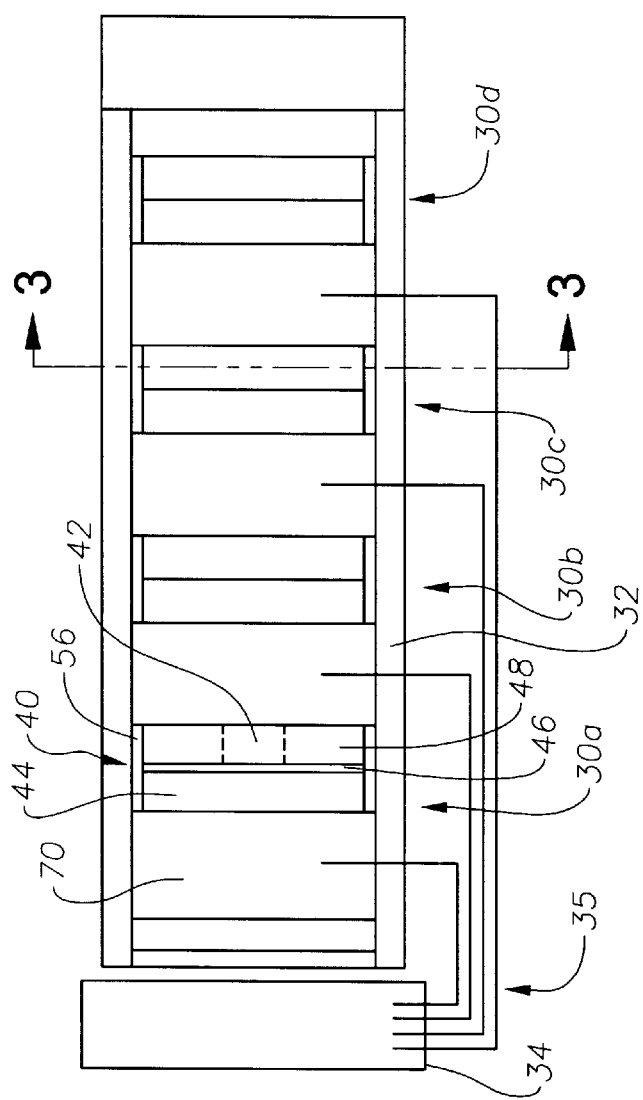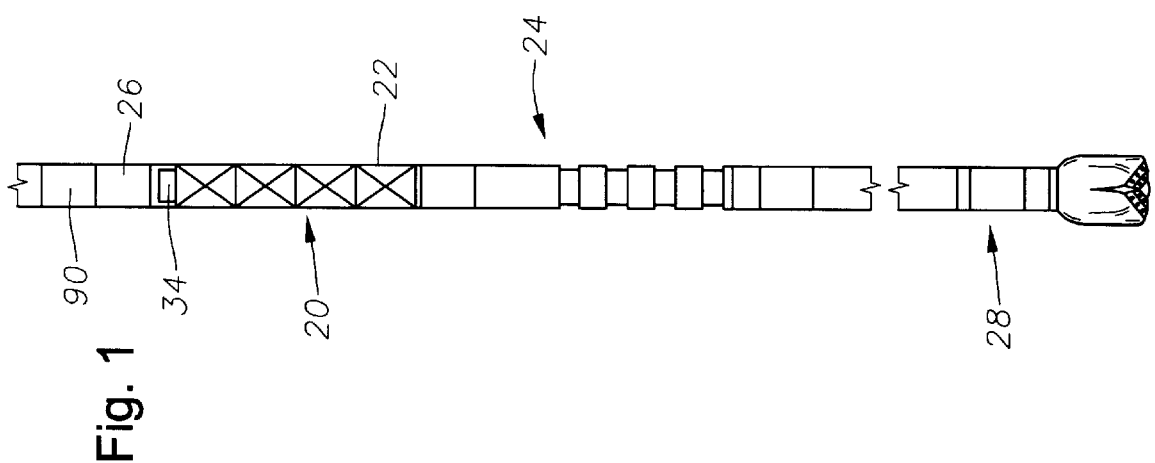

Focused Gamma Wiring Diagram

RADIATION DETECTOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to devices that detect radiation emitted by sources in subterranean formations. More particularly, the present invention relates to devices that use a plurality of stationary gamma ray detectors to locate the source of gamma rays in a formation in the vicinity of a well bore. Still more particularly, the present invention relates to devices that utilize four gamma ray sondes to detect gamma rays from four discrete sectors of formation surrounding a well bore.

2. Description of the Related Art

The recovery of subterranean hydrocarbons such as oil and gas often involves an substantial investment in drill rig structures and expensive drilling operations. In order to maximize the return on both of these expenditures, rig operators may utilize one or more horizontal well bores that branch from a single vertical well bore. One situation suited to this technique involves a vertical well bore that is too distant from hydrocarbon deposits to permit efficient recovery. By drilling horizontally from a vertical well bore towards the hydrocarbon deposits, recovery is enhanced without the need for multiple drill rigs on the surface. Moreover, where a vertical well bore has penetrated into a productive hydrocarbon deposit, a horizontal well bore can improve the drainage of hydrocarbons into the well bore.

Effective horizontal drilling can often be accomplished by a steerable drilling assembly. Steerable drilling assemblies are discussed in pending application Ser. No. 09/081,961, filed May 20, 1998 and entitled "Well System," which is hereby incorporated by reference. When drilling horizontally, it is desirable to maintain the well bore in the pay zone, the formation containing hydrocarbons, as much as possible so as to maximize the recovery. However, pay zones may dip or divert in an unpredictable manner. Consequently, as a drilling assembly progresses through a pay zone, the drill bit may approach an adjacent nonproductive strata. The pay zone and adjacent strata define a bed boundary within which the operator may wish to confine drilling activity. Effective "steering" of the drilling assembly so as to maintain the bore within the pay zone is possible only where the operator has information relating to subterranean geology and ambient conditions.

Recently, the industry has developed a variety of devices and techniques to collect data during the drilling process. By collecting and processing data during the drilling process, the operator can make accurate modifications or corrections on-the-fly, as necessary, to optimize drilling operations. Designs for measuring conditions downhole and the movement and location of the drilling assembly, contemporaneously with the drilling of the well, have come to be known as "measurement-while-drilling" (MWD) techniques.

Gamma ray (GR) detectors are one type of tool that has been used in MWD and that can assist in maintaining a drilling assembly within the pay zone. Historically, gamma ray detectors have been used to either detect naturally occurring gamma rays in the formation or detect gamma rays emitted by an artificial source.

Passive gamma ray spectroscopy tools were developed in the mid-1970's to identify naturally-occurring radioactive elements emitting gamma rays in a formation. Gamma rays produced by different isotopes have characteristic energy spectra that can be used to identify the substance of the source emitting the gamma rays. In passive gamma ray logging, the naturally occurring radioactive isotopes, most commonly potassium, uranium and thorium, that are often present in a formation are the source of gamma rays sensed by the passive GR detectors. The incidence of gamma rays on the detectors, along with known information about the response of the tool, gives information about the source of the gamma rays, and thus gives information about the formation itself.

Prior art passive GR detectors include a scintillation crystal and a photomultiplier tube (PMT). The prior art GR detector is disposed in a pressure housing secured in a rotating portion of the drill string. Such a scintillation crystal reacts to incident gamma rays from a source at any angular location about the rotational axis of the drill string. While this would provide information as to the source of the gamma ray, this design would not provide some information as to the angular location of the gamma ray source. To obtain directional data, a GR shield may be installed in such a manner so as to limit the scintillation crystal's exposure to incident gamma rays to a specific azimuthal portion, or sector, of formation surrounding the prior art detector. A motor or other means rotates the directionally-sensitive OR detector that measures incident radiation in each of the angular directions as it rotates about the axis of the drill string. Thus, when a directional GR detector is facing the source of the gamma rays, the detector readings will be at their highest amplitude. Then as the directional GR detector rotates away from the isotopes, the signal decreases. The operator at the surface looks for the maximum in the gamma ray reading to determine the angular direction of the gamma ray source. The angular direction is thereby correlated to a useful azimuthal direction; that is, an angular direction relative to a known fixed point on a plane perpendicular to the axis of the drill string.

It is further known that a GR tool providing directional gamma ray information can be readily adapted to locate artificial sources of gamma rays in a formation. Specifically, GR tools can identify tracers, or radioactive isotopes, placed downhole. Thus, a tracer spectroscopy tool was developed to track the dispersion of frac fluids and solids from a wellbore and into the formation. Fracturing fluids and solids are pumped under high pressure into the formation surrounding the well bore to initiate and enlarge the fractures in the formation. These fractures then become packed with the solids, which are preferably a granular material that is highly permeable to the flow of hydrocarbons. This process assists the flow of hydrocarbons from the formation into the well bore. Using a directional GR tool together with radioactively tagged solids, the operator of the well can identify where the maximum frac fluids and solids flowed into the formation by analyzing the directional gamma ray signals from the formation.

Artificial gamma rays can also be generated by a source deployed in conjunction with gamma ray detector itself. Some of the gamma rays emitted by the source are reflected back by formation material and are detected by GR detectors. By analyzing the reflected gamma rays, the operator can ascertain the geological properties of the formation in the immediate vicinity of the GR detectors even in the absence of any naturally occurring gamma rays.

The utility of gamma ray detectors in analyzing the surrounding formation has led to their use in directing steerable drilling assemblies through the pay zone. Normally, gamma ray measurements in a particular pay zone are azimuthally uniform because such a pay zone consists mostly of one material, such as sandstone, throughout which the gamma ray emitting materials are more or less uniformly distributed. Strata material such as shale and sandstone have reasonably distinct levels of gamma ray emission counts. Thus, one method of maintaining a drilling path through the pay zone is to continually monitor the azimuthal directions of gamma ray emissions proximate to the steerable drilling assembly. As the drilling assembly nears a bed boundary, a directional GR detector will sense a variation in gamma ray measurements as a function of the azimuthal orientation. This is because the material in the adjacent strata emits gamma rays at a different rate from the pay zone. Once the variation is detected and its location is established, the operator can make corrections in accordance with known techniques to avoid exiting the pay zone.

Prior art directional GR detectors require a rotating section of drill string in order to sense gamma ray emissions from the 360 degree azimuth around the axis of the drill string. Steerable drilling assemblies can include rotating subs that could accommodate such GR detectors. However, some steerable drilling assemblies do not have a rotating drill string section suited for rotating directional GR detectors. For example, during "sliding" drilling, the portion of the drill string where the GR detector is housed is uphole of the mud motor and is not rotated. A motor can be used to rotate the section of drill string in which the prior art directional GR detector is mounted, but this string increases the power consumption due to the electrical or hydraulic power needed to rotate the detector and drill string section. Further, the steerable drilling assembly may not have a diameter large enough to accommodate a rotating section of drill string.

Thus, a need persists for a gamma ray detector that provides azimuthally sensitive gamma ray detection without unduly increasing power consumption and without limiting an operation to a specific type of steerable drilling assembly.

SUMMARY OF THE INVENTION

The present invention includes a pressure barrel and a plurality of sondes disposed therein. Each sonde detects gamma radiation primarily from a discrete section of an earth formation. The GR data from these sondes are integrated to provide detection of the complete azimuth from the surrounding formation. A preferred embodiment uses four sondes to receive gamma rays from four discrete sectors of an earth formation. The present invention does not require rotation and may remain stationary when detecting gamma radiation in the formation.

Thus, the present invention comprises a combination of features and advantages which enable it to overcome various problems of prior devices. The various characteristics described above, as well as other features, will be readily apparent to those skilled in the art upon studying the following detailed description of the preferred embodiments of the invention, and referring to the accompanying drawings.

BRIEF DESCRIPTION OF THE DRAWINGS

For a more detailed description of the preferred embodiment of the present invention, reference will now be made to the accompanying drawings, wherein:

FIG. 1 is a side view of an embodiment of the invention mounted on a drill string;

FIG. 2 is a schematic view of an embodiment of the invention;

DETAILED DESCRIPTION OF THE PREFERRED EMBODIMENT

Figure 3:
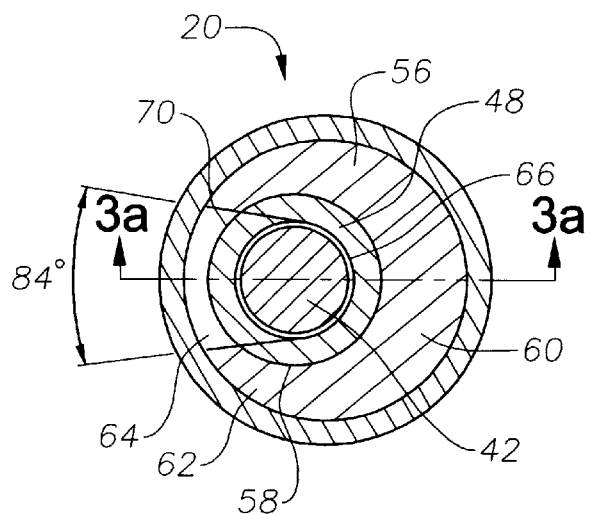
FIG. 3 is a cross sectional view along lines 3—3 of FIG. 2.

Referring now to FIG. 1, directional gamma ray tool 20 is preferably disposed within a non-rotating sub 22 of a drill string 24 and energized using local battery power (not shown) or surface power source (not shown). A directional attitude sensor 26 cooperates with tool 20 to provide an operator with the azimuthal direction required to direct a steerable drilling assembly 28.

Referring now to FIG. 2, tool 20 includes four gamma ray (GR) sondes 30a–d, a pressure barrel 32, and an electronics module 34. Wiring 35 connects each GR sonde 30a–d to electronics module 34. Each GR sonde 30a–d includes a GR detector assembly 40 and a sensor electronics package 70. GR detector assembly 40 includes a scintillation crystal 42, a photomultiplier tube (PMT) 44, an optical coupler 46, a shell 48, and a GR shield 56.

Figure 3A:
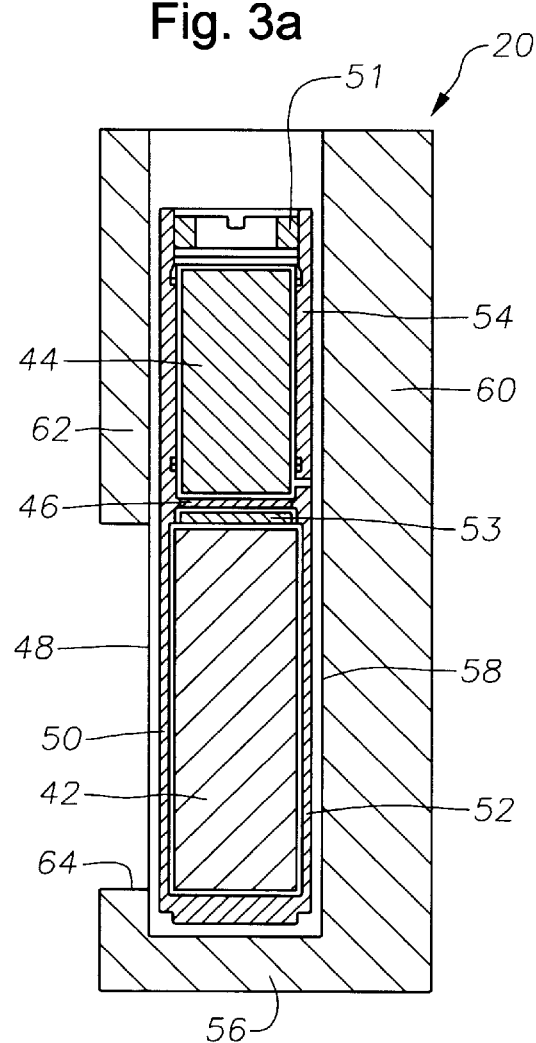
FIG. 3a is a cross sectional view along lines a—a of FIG. 3.

Referring now to FIGS. 3 and 3a, tool 20 preferably uses a phosphor such as thallium doped sodium iodide for scintillation crystal 42. Scintillation crystal 42 scintillates in response to incident gamma radiation. Depending on the gamma photon energy, incident radiation can produce scintillations in the phosphor as a result of photoelectric absorption, Compton scattering, or pair production. Scintillation crystal 42 is preferably formed as a cylindrical member. It is known that a cylindrical geometry allows efficient light collection and conversion between scintillation crystal 42 and PMT 44 (FIG. 3a). While thallium doped sodium iodide is utilized as the preferred phosphor for tool 20, the present invention encompasses any material that reacts in a predictable manner when exposed to incident gamma radiation.

Referring now to FIG. 3a, PMT 44 converts the scintillations from sodium iodide crystal 42 to countable electrical pulses that can ultimately be processed into directional information by suitable electronic circuitry, most generally in modem practice, under the control of one or more micro processors. PMT 44 reacts to the sodium iodide crystal 42 scintillations by producing a electrical signal having an amplitude that is proportional to the intensity of the scintillation in sodium iodide crystal 42. The electrical signals produced by PMT 44 are transmitted to sensor electronics package 70 (FIG. 2). PMTs are well known in the art and suitable designs will be readily apparent to one of ordinary skill in the art. For example, PMT 44s/n TA0615 made by HAMAMATSU, Inc. is one such suitable device.

Still referring to FIG. 3a, shell 48 houses scintillation crystal 42, PMT 44, and optical coupler 46. Preferably, shell 48 is a stainless steel cylindrical member having a bore 50. Bore 50 has a first portion 52 suitable for permanently receiving scintillation crystal 42. Quartz window 53 seals scintillation crystal 42 within first portion 52 of bore 50. Scintillation crystal 42 is primarily a sodium iodide salt that is easily damaged if it comes into contact with water or moisture. Moreover, preferred scintillation crystal 42 includes thallium, a toxic substance.

Accordingly, first portion 52 of bore 50 should provide scintillation crystal 42 with a hermetically sealed environment such as that achievable by methods such as electron beam welding. Further, shell 48 should secure scintillation crystal 48 in a manner that minimizes the risk of scintillation crystal 42 shattering or cracking when subjected to shock or vibrations. Bore 50 also includes a second portion 54 for retaining optical coupler 46 and PMT 44. A locknut 51 may be used to capture optical coupler 46 and PMT 44 in second portion 54 of bore 50. Design for shells for scintillations crystals are known in the prior art and are commercially available.

Optical coupler 46 is a transparent medium that promotes efficient transfer of light from scintillation crystal 42 to PMT 44. Optical coupler 46 is juxtaposed between PMT 44 and scintillation crystal 42 to eliminate interfacial reflections of light. Preferably, optical coupler 46 is a silicon based plastic or gel. Because optical coupler 46 is preferably contiguous with quartz window 53 and PMT 44, optical coupler 46 can also act as a shock absorption barrier between PMT 44 and scintillation crystal 42.

Referring to FIGS. 3 and 3a, GR shield 56 allows for the preferential absorption of gamma photons from a limited sector of formation surrounding tool 20 by scintillation crystal 42. Preferably, GR shield 56 is formed of tungsten or other material not easily penetrated by gamma rays. GR shield 56 may be substantially tubular and include an eccentric bore 58, a rear wall 60, and a front wall 62. Eccentric bore 58 of GR shield 56 receives shell 48. Front wall 62 of GR shield 56 includes an aperture 64. Aperture 64 provides a passage through GR shield 56 that allows gamma rays from a limited sector of formation to activate scintillation crystal 42. The geometry of aperture 64 defines the angular extent of the formation sector to which sodium iodide crystal 42 is exposed. Design of aperture 64 should account for gamma ray penetration through the relatively thin front wall 62 proximate to aperture 64. For example, an aperture having an 84 degree angular width can be expected to receive gamma rays from a 90 degree sector.

Referring now to FIG. 3, rear wall 60 significantly attenuates gamma rays from the remaining sector of formation surrounding tool 20 impinging on scintillation crystal 42. Preferably, rear wall 60 should be as thick as possible in order to minimize extraneous gamma photon flux that may activate scintillation crystal 42. Using eccentric bore 58 instead of a concentric bore provides rear wall 60 with such additional thickness. It is believed that rear wall 60 thicknesses of greater than 0.6 inches will provide satisfactory gamma ray attenuation in many applications. However, it will be understood that there are numerous variations to the design of GR shield 56 and the present invention is not limited to the particular preferred design discussed above.

It will be appreciated that the arrangement of GR detector assembly 40 is influenced by the radiation attenuating capability of GR shield 56. The embodiment shown is believed to be adequate for bore holes of approximately four inches to six inches in diameter. The use of tungsten for GR shield 56, and the preferred minimum thicknesses thereof, thus suggests the axial arrangement of GR detector assemblies 40 shown in FIG. 2. However, if bore hole diameters are sufficiently large or if radiation attenuating materials permit a sufficiently thin rear wall 60, then GR detector assemblies 40 may be arranged in a "back-to-back" fashion or even bundled. Such alternate embodiments would provide considerable reduction in the overall length of tool 20. Alternatively, any additional space that may be available may be used to increase the amount of shielding and the size of the detector. It is expected that increased shielding and a larger detector will improve the overall performance of GR detector assembly 40.

In the embodiment shown, tool 20 uses four GR detector assemblies 40 (FIG. 2). Thus, each aperture 64 (FIG. 3) has an angular width of approximately 84 degrees in order to receive gamma rays from four 90 degree radial sectors, for 360 degree coverage. Thus, the location of a source of gamma rays in the formation can be narrowed to one of four directions. The use of eight GR sondes would result in 45 degree radial sectors and further narrow the location of a gamma ray source to one of eight directions. However, the overall length of tool 20 would have to be increased to accommodate an additional four GR sondes. It is believed that using four GR sondes 30a–d provides a balance between directionality and compactness. It should be understood that tool 20 is not limited to only four GR sondes and more or fewer sondes may be used without departing from the essence of the present invention.

Figure 4B:
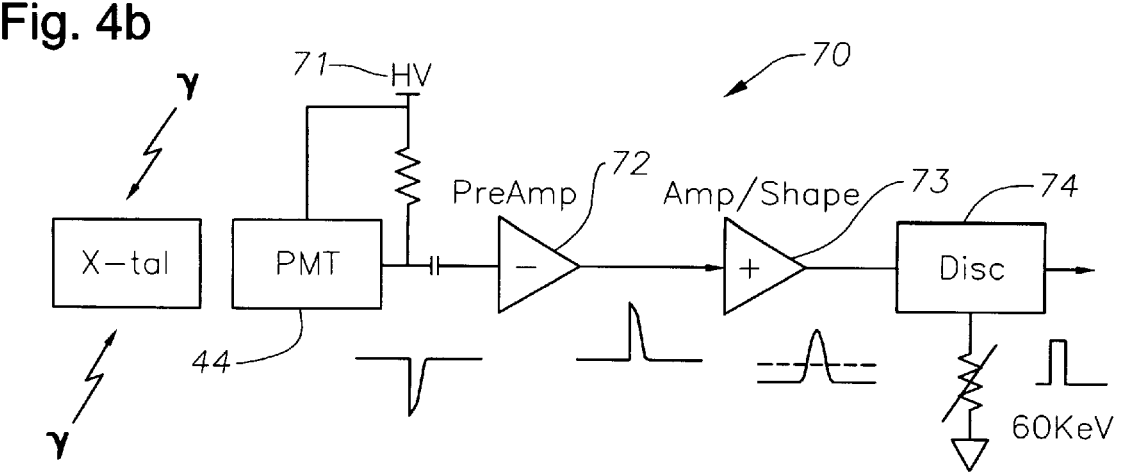
FIG. 4b is a detailed electrical schematic diagram of an embodiment of the invention.
Figure 4:
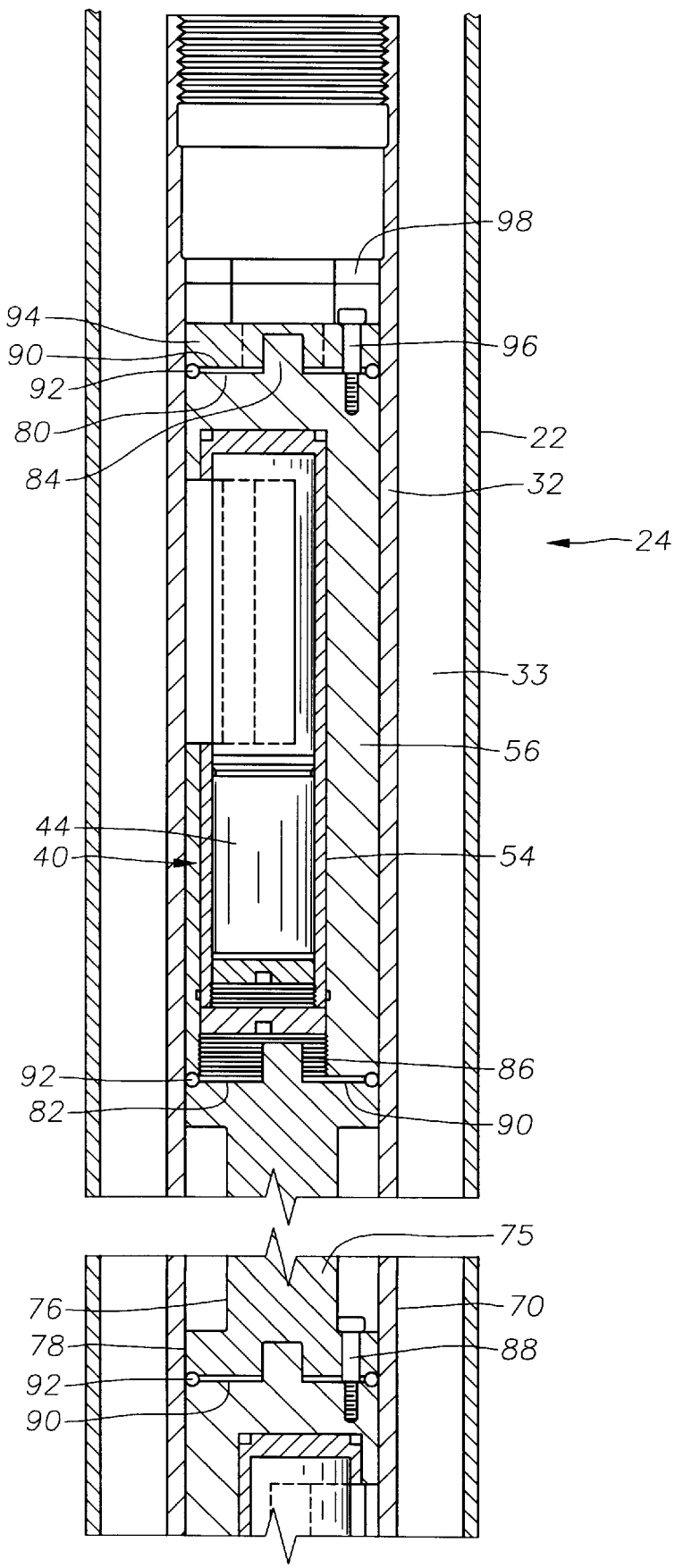
FIG. 4 is a detailed sectional view of an embodiment of the invention.
Figure 4A:
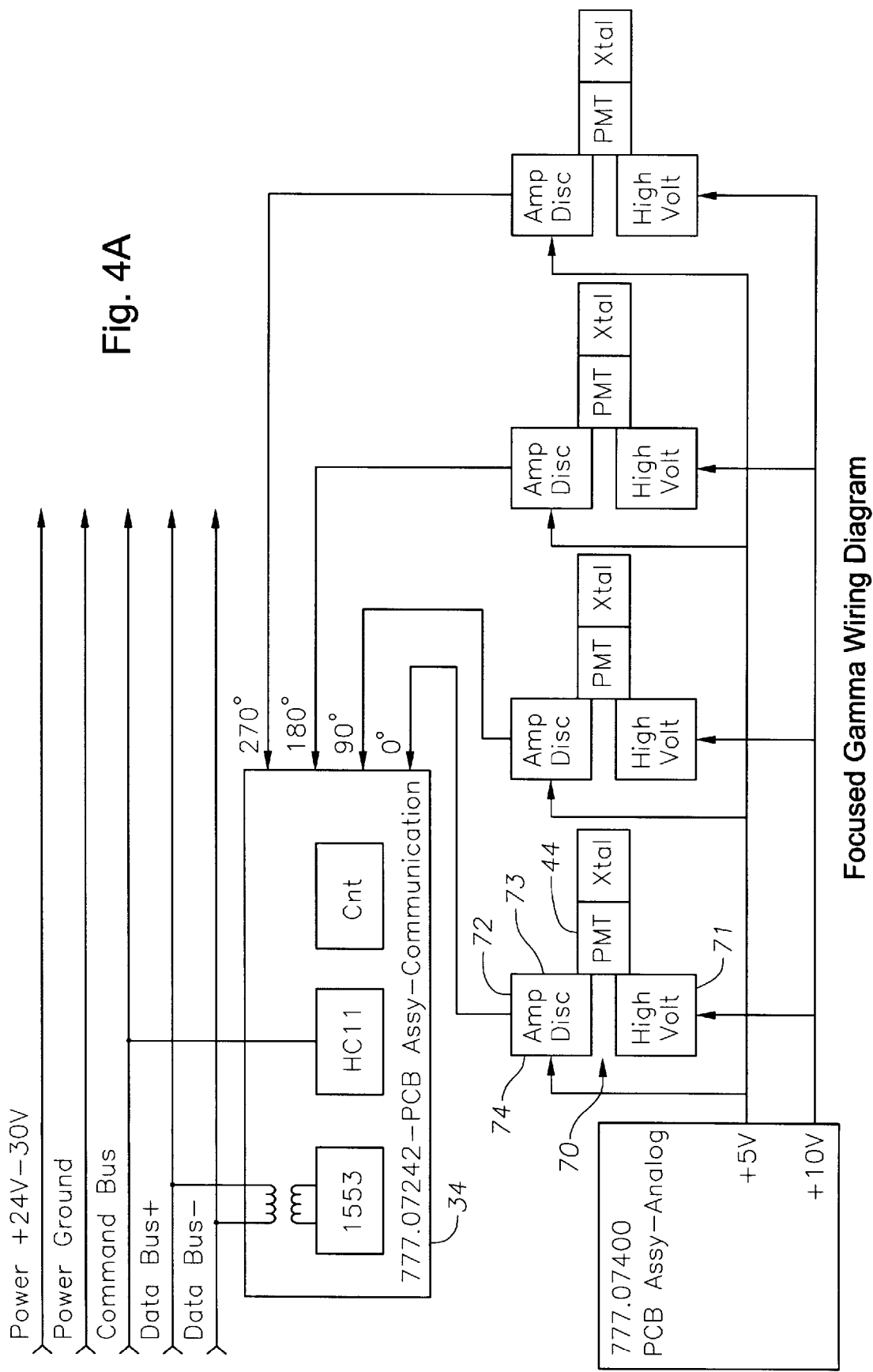
FIG. 4a is an electrical schematic diagram of an embodiment of the invention.

Referring now to FIG. 4, sensor electronics package 70 amplifies and processes PMT 44 signals before the signals are transmitted to electronics module 34 (FIG. 2). Electronics module 34 provides a communication link to telemetry system (not shown). Referring now to FIGS. 4a and 4b, sensor electronics package 70 includes a high voltage power supply 71, a pre-amplifier 72, an amplifier 73, and a discriminator 74. High voltage power supply 71 provides the power needed to operate MPT 44. Pre-amplifier 72 boosts the electrical signal from PMT 44. Preferably, pre-amplifier 72 is located as close as possible to PMT 44 in order to minimize interference due to noise. Amplifier 73 further boosts PMT 44 electrical signals and converts the signals into a smooth wave form. Discriminator 74 is set at a pre-determined threshold (e.g., approximately 60 keV) in order to eliminate PMT 44 signals below that threshold. Because downhole telemetry systems can transmit only a limited volume of data, it is expected that the elimination of uninformative signals by using a discriminator 73 can optimize the operation of the downhole telemetry. The design of pre-amplifiers, discriminators and voltage supplies are well known in the art and would be apparent to one of ordinary skill in the art. After signals are transmitted via telemetry system (not shown) to the surface, means such as a data processor may be used to correlate the signals into useful azimuthal directional data. Methods and systems for processing downhole data into azimuthal directional data are discussed in co-pending application Ser. No. 09/276,270, filed concurrently herewith and filed concurrently herewith and entitled Method For Determining Symmetry And Direction Properties Of Azimuthal Gamma Ray Distributions which is hereby incorporated by reference.

Referring now to FIG. 4, each sensor electronics package 70 is electrically connected to an associated GR detector assembly 40. Sensor electronics package 70 includes a frame 75 having a cavity 76 wherein the electronic circuitry (not shown) is retained. Frame 75 has a first flange end 77 that abuts the adjacent GR shield 56 of associated GR detector assembly 40 and a second flange end 78 that abuts adjacent GR sonde 30. Electronic communication between electronic sensor package 70 and GR detector assembly 40 may be accomplished using a male/female connector plug (not shown).

In order to maintain proper angular alignment between GR sondes 30a–d, a tongue-in-groove arrangement may be provided on GR shield 56. For example, GR shield 56 may further include a first and second face 80,82. First face 80 may include a tongue 84 and second mating face 82 may include a groove 86 offset ninety degrees from tongue 84. Radially offset tongue and grooves are similarly provided on each GR shield 56 of remaining GR sondes 30b–d. Frames 75 of sensor packages 70 also may use a tongue-in-groove arrangement, however no offset is utilized in order to preserve the angular alignment between each GR shields 56.

Pressure barrel 32 protects GR sondes 30a–d and associated wiring 35 (FIG. 2) from the well bore environment. Pressure barrel 32 is preferably generally tubular and is adapted to fit within the non-rotating section 22 of drill string 24. Preferably, an annular space 33 is provided between pressure barrel 32 and the non-rotating section of drill string 24 (FIG. 1) in which pressure barrel 32 is mounted. Annular space 33 permits drilling mud to be pumped to the drilling assembly 28 (FIG. 1) during drilling. Pressure barrel 32 may be formed from any material, such as steel, that provides crush resistance and prevents drilling mud and other corrosive well bore elements from damaging GR sondes 30a–d and associated wiring 35 (FIG. 2).

GR sondes 30a–d may be installed into pressure barrel 32 in any number of methods. Tool 20 utilizes a close tolerance fit between the interior of pressure barrel 32 and the exterior of GR sondes 30a–d. Preferably, GR sondes 30a–d are axially disposed within pressure barrel 32. Fasteners 88 connect GR shield 56 and electronics sensor assembly 70 in a manner that leaves a small gap 90 between GR shield 56 and sensor assembly 70. Snap rings 92 are interposed in each small gap 90. End caps 94, fasteners 96 and locknuts 98 are disposed at opposite ends of the outermost GR sondes 30a,d (FIG. 2). Locknuts 98 are mechanically secured to pressure barrier 32 by means such as mating threads. End caps 94 are interposed between locknuts 98 and GR sondes 30a,d. Fasteners 96 connect locknuts 98 to GR sondes 30a,d. End caps 94 and locknuts 98 are provided with conduits (not shown) to accommodate wiring (not shown) associated with GR sondes 30a–d. Rotation of locknuts 98 compresses GR shields 56 and sensor electronics packages 70 within pressure barrel 32 and thereby reduces gaps 90 between GR shields 56 and sensor packages 70. As gaps 90 close, snap rings 92 are forced outward and pressed against interior of pressure barrel 32. GR sondes 30a–d are thereby held securely within pressure barrel 32.

Referring now to FIG. 1, directional attitude sensor 26 establishes the physical orientation of GR sondes 30a–d. In non-vertical drilling, drill string 24 may distort or otherwise orient itself in a manner not predictable to the operator. Directional attitude sensor 26 provides the operator with an indication of how the GR sondes 30a–d are oriented in the well bore. Such information provides an azimuthal reference point for the signals received from the GR sondes. Directional attitude sensors 26 are known in the art and their design will be obvious to one of ordinary skill in the art.

Tool 20 is most effective if placed close to steerable drilling assembly 28. Such a location provides the operator with an early indication that the steerable drilling assembly 28 is approaching a bed boundary. Therefore, it is more likely that the corrective action taken will prevent the steerable drilling assembly 28 from straying into a non-productive stratum. Nonetheless, tool 20 may be also placed uphole of the mud motor and still provide effective guidance for steerable drilling operations.

During operation, tool 20 is deployed in a vertical well bore with a steerable drilling assembly and an array of associated instruments. As the steerable drilling assembly deviates from the vertical well bore and proceeds into a pay zone, tool 20 provides continuous readings of the gamma rays in the vicinity of the steerable drilling assembly. Specifically, GR sondes receive gamma rays from their respective sectors of formation. Because the material of the formation in the pay zone is substantially uniform and will have a uniform gamma ray incidence, it is expected that scintillation crystals will scintillate at a fairly constant rate and level. The scintillations are converted to electrical signals by electronics assembly and transmitted to the surface for processing. Should the steerable drilling assembly approach a bed boundary, one or more of GR sondes 30a–d will receive gamma rays emitted by substances not present in the pay zone. Accordingly, the gamma ray emission counts of one or more of the GR sondes will increase or decrease (depending on the material in the adjacent strata). Because the electrical signals are transmitted continuously, the operator will have an immediate indication that a boundary of the pay zone may be near. When the signal variation is noted from GR sondes 30a–d, the operator can process the signals to determine the azimuthal location of the sources of the gamma rays and, if necessary, take appropriate action to re-direct the steerable drilling assembly.

It will be appreciated that the present invention can easily be adapted to detect various forms of radiation, in addition to gamma radiation. Accordingly, the gathering of azimuthal directional information is merely one of numerous useful forms of data the present invention can provide. For example, an artificial radiation source can be deployed in conjunction with the present invention to ascertain formation characteristics. The artificial radiation source may be a neutron or gamma ray emission source. The present invention when combined with a neutron and/or gamma ray emission source can provide information such as rock density, porosity, and water saturation.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A gamma ray tool mounted in drill string disposed in a well bore through a formation, comprising:
   a pressure barrel secured in a non-rotating portion of the drill string; and
   a plurality of gamma ray sondes disposed within said pressure barrel, each of said sondes including a scintillation crystal disposed within a gamma ray shield, said shield shielding said scintillation crystal from incident gamma radiation except from a discrete azimuthally limited sector of formation relative to the longitudinal axis of the drill string, said sondes collectively cooperating to detect gamma rays from all azimuthal locations about the longitudinal axis of the drill string.

2. The gamma ray tool of claim 1 wherein at least four gamma ray sondes are axially disposed within said pressure barrel, each of said gamma ray sondes receiving gamma rays from a sector of formation no greater than approximately 90 degrees.

3. The gamma ray tool of claim 1 further comprising a directional attitude sensor, said directional attitude sensor indicating the orientation of said gamma ray tool relative to the formation.

4. The gamma ray tool of claim 1 wherein said gamma ray sondes each further comprise a detector and an electronics package, said detector generating signals corresponding to the level of incident gamma rays, and said electronics package processing signals generated by said detector.

5. A gamma ray tool mounted in drill string disposed in a well bore through a formation, comprising:
   a pressure barrel secured in a non-rotating portion of the drill string; and
   a plurality of gamma ray sondes disposed within said pressure barrel, each of said sondes directed to a discrete azimuthally limited sector of formation relative to the longitudinal axis of the drill string, said sondes collectively cooperating to detect gamma rays from all azimuthal locations about the longitudinal axis of the drill string, wherein said gamma ray sondes each further comprise a detector and an electronics package, said detector generating signals corresponding to the level of incident gamma rays, and said electronics package processing signals generated by said detector; wherein said detector further comprises a gamma ray shield, said gamma ray shield having an eccentric bore; and a scintillation crystal disposed within said eccentric bore of said gamma ray shield.

6. The gamma ray tool of claim 1 further comprising an artificial radiation source, said source disposed proximate to said sondes along the drill string, said sondes collectively cooperating to detect radiation emitted by said artificial radiation source.

7. A tool for detecting gamma rays in a formation, comprising:
   an elongated cylindrical member having a bore;
   a plurality of sondes disposed within said bore of said elongated cylindrical member, said sondes each having a cavity;
   a housing mounted within said cavity of each of said sondes; said housing having a first interior portion and a second interior portion;
   a scintillation crystal disposed in said first portion of said housing;
   a shield enveloping each said scintillation crystal; said shield having an aperture, each of said apertures of said shields directed to a separate sector of formation relative to axis of the drill string; and
   a photomultiplier tube disposed within each of said second interior portions of said housings, each said photomultiplier tube optically coupled with adjacent said scintillation crystal.

8. The tool of claim 7 wherein scintillation crystal comprises of thallium doped sodium iodide.

9. The tool of claim 7 wherein said gamma ray shield comprises of tungsten.

10. The tool of claim 7 wherein four sondes are axially disposed within said bore of said elongated cylindrical member.

11. The tool of claim 7 further comprising an artificial radiation source, said source disposed proximate to said sondes along the drill string, said sondes collectively cooperating to detect radiation emitted by said artificial radiation source.

12. A system for measuring radiation in a formation, comprising:
   a non-rotating cylindrical member having a cavity; and
   a plurality of sondes disposed within said cavity of said non-rotating cylindrical member, each of said sondes focused on an azimuthally limited sector of formation relative to the longitudinal axis of said non-rotating cylindrical member, wherein said sondes each further include a detector, said detector having a radiation shield configured to expose said detector to radiation from the azimuthally limited sector of formation, said detector generating signals corresponding to the level of incident radiation, said sondes collectively cooperating to detect radiation from all azimuthal locations about the longitudinal axis of said non-rotating cylindrical member.

13. The system of claim 12 wherein said sondes further comprise an electronics package that processes the signals produced by said detector.

14. The system of claim 12 wherein said sondes produce electrical signals in response to incident radiation; and further comprises a data processor for processing the electrical signals.

15. The system of claim 13 wherein said detector is adapted to detect gamma radiation.

16. The system of claim 12 further comprising an artificial radiation source, said source disposed proximate to said sondes along the drill string, said sondes collectively cooperating to detect radiation emitted by said artificial radiation source.

17. The system of claim 15 wherein at least four sondes are axially disposed within said non-rotating cylindrical member, each of said sondes receiving gamma radiation from a sector of formation no greater than approximately 90 degrees.

18. A method of determining subterranean formation properties comprising:
   installing a plurality of sondes in a non-rotating section of drill string, each sonde including a detector;
   shielding each detector from incident radiation except from an azimuthally limited sector of the formation;
   orienting each sonde to receive radiation from a separate sector of formation such that together said sondes receive radiation from substantially all angular locations about axis of said sondes;
   measuring incident radiation in the formation;
   converting the radiation measurements into electrical signals; and
   processing the signals to determine the location of the radiation source.

19. The method of claim 18 wherein said sondes receive gamma radiation.

20. The method of claim 18 further comprising processing the signals to determine the material properties of the radiation source.

21. The method of claim 18 further comprising emitting radiation into the formation using an artificial radiation source; and detecting the incident radiation in the formation.

22. The method of claim 18 further comprising determining the orientation of the drill string relative to the formation; and correlating the sonde measurements with the orientation of the drill string to obtain an azimuthal location of the source of the gamma radiation.

23. A method of steering a steerable drilling assembly through a pay zone, comprising:
   shielding a scintillation crystal from incident gamma rays using a radiation shield having an eccentric bore for receiving the scintillation crystal;

exposing the scintillation crystal to incident gamma rays from a pre-determined azimuthal sector of formation;

establishing the level of incident gamma rays within the pay zone by using the response of the scintillation crystal to incident gamma rays;

measuring incident gamma rays from a plurality of azimuthally limited sectors of formation about an axis of a drill string;

monitoring gamma ray measurements for variances from established pay zone incident gamma ray levels; and re-orienting steerable drilling assembly to avoid azimuthal sector in which variances were detected.

24. The method of claim 18 wherein at least four azimuthally limited sectors of formation are measured for incident gamma rays from about an axis of a drill string.

25. The method of claim 18 further comprising determining the orientation of the drill string; and correlating the incident gamma ray measurements with the drill string orientation.

26. A gamma ray tool mounted in drill string disposed in a well bore through a formation, comprising:

a pressure barrel; and at least four gamma ray sondes disposed within said pressure barrel, each of said sondes including a detector provided with a gamma ray shield, said shield shielding said detector from incident gamma radiation except from a discrete azimuthally limited sector of formation relative to the longitudinal axis of the drill string, said sondes collectively cooperating to detect gamma rays from all azimuthal locations about the longitudinal axis of the drill string.

27. The gamma ray tool of claim 26 wherein said sondes are not rotated along axis of the drill string.

28. A gamma ray tool mounted in drill string disposed in a well bore through a formation, comprising:

a plurality of gamma ray sondes disposed within said tool, each of said sondes directed to a discrete azimuthally limited sector of formation relative to the longitudinal axis of the drill string, said sondes collectively cooperating to detect gamma rays from all azimuthal locations about the longitudinal axis of the drill string, said gamma ray sondes each including a detector, said detector generating signals corresponding to the level of incident gamma rays, said detector including a gamma ray shield, said gamma ray shield having an eccentric bore and a scintillation crystal disposed within said eccentric bore of said gamma ray shield.

29. The tool according to claim 28, further including a pressure barrel secured in a non-rotating portion of the drill string, wherein said sondes are disposed within said pressure barrel.

* * * * *